(12) United States Patent
Kim (10) Patent No.: US 9,391,499 B2
(45) Date of Patent: Jul. 12, 2016

(54) AMORPHOUS DIVIDED-CORE STATOR AND AXIAL-GAP-TYPE MOTOR USING SAME

(75) Inventor: Byoung Soo Kim, Anyang-si (KR)

(73) Assignee: AMOTECH CO., LTD. (KR)

( * ) Notice: Subject to any disclaimer, the term of this patent is extended or adjusted under 35 U.S.C. 154(b) by 506 days.

(21) Appl. No.: 14/006,166

(22) PCT Filed: Mar. 23, 2012

(86) PCT No.: PCT/KR2012/002131
§ 371 (c)(1),
(2), (4) Date: Sep. 19, 2013

(87) PCT Pub. No.: WO2012/134114
PCT Pub. Date: Oct. 4, 2012

(65) Prior Publication Data
US 2014/0009022 A1    Jan. 9, 2014

(30) Foreign Application Priority Data

Mar. 25, 2011    (KR) .................. 10-2011-0026884

(51) Int. Cl.
*H02K 21/14* (2006.01)
*H02K 1/14* (2006.01)
(Continued)

(52) U.S. Cl.
CPC ............... *H02K 21/145* (2013.01); *H02K 1/14* (2013.01); *H02K 1/2793* (2013.01); *H02K 3/524* (2013.01); *H02K 21/24* (2013.01); *H02K 1/02* (2013.01)

(58) Field of Classification Search
CPC ....... H02K 1/14; H02K 21/145; H02K 3/524; H02K 21/24; H02K 1/2793; H02K 1/12; H02K 1/18; H02K 15/02

USPC .......... 310/49.02, 49.04, 49.09, 49.19, 49.22, 310/49.32, 49.42, 156.32, 156.82, 216.008
See application file for complete search history.

(56) References Cited

U.S. PATENT DOCUMENTS

| 6,445,105 B1 * | 9/2002 | Kliman .................... H02K 1/14 310/156.35 |
| 7,221,073 B2 | 5/2007 | Yamada et al. |

(Continued)

FOREIGN PATENT DOCUMENTS

| JP | 2000253635 | 9/2000 |
| KR | 100213571 | 5/1999 |

(Continued)

OTHER PUBLICATIONS

International Search Report—PCT/KR2012/002131 dated Sep. 26, 2012.

*Primary Examiner* — Naishadh Desai
(74) *Attorney, Agent, or Firm* — Cantor Colburn LLP (57) ABSTRACT

Provided are an amorphous split core stator, which maximizes an opposing area between a plurality of split cores and magnets, increases a fill factor of coils, and which is molded by using amorphous metallic powder to thereby minimize an eddy current loss (or a core loss), and an axial gap type motor using the same. The axial gap type amorphous split core motor includes: a rotating shaft whose both ends are rotatably supported; first and second annular yokes the center of each of which is combined with the rotating shaft and that are placed at an interval therebetween; first and second rotors having a plurality of magnets that are mounted on the inner surfaces of the first and second yokes with polarities opposite to each other; and a stator having a plurality of split cores that are placed between the first and second rotors and on each of which a coil is wound, in which the split cores are molded by using amorphous metallic powder.

12 Claims, 7 Drawing Sheets

(51) Int. Cl.
*H02K 1/27* (2006.01)
*H02K 3/52* (2006.01)
*H02K 21/24* (2006.01)
*H02K 1/02* (2006.01)

(56) References Cited

U.S. PATENT DOCUMENTS 7,960,884 B2 * 6/2011 Miyata ................... H02K 21/24
310/14
8,179,016 B2 * 5/2012 Asano ................... F04C 23/008
310/156.32
2002/0153792 A1 * 10/2002 Isozaki ..................... H02P 8/14
310/112
2004/0135452 A1 * 7/2004 Tu ............................ H02K 3/04
310/156.32

FOREIGN PATENT DOCUMENTS

KR 1020090104451 10/2009
KR 1020100031688 3/2010

* cited by examiner

AMORPHOUS DIVIDED-CORE STATOR AND AXIAL-GAP-TYPE MOTOR USING SAME

TECHNICAL FIELD

The present invention relates to an amorphous split core stator and an axial gap type motor using the same. More particularly, the present invention relates to an amorphous split core stator and an axial gap type motor using the same, which maximizes an opposing area between a plurality of split cores and magnets, increases a fill factor of coils, assembles a plurality of the split cores through coupling of irregularities between bobbins or through an auxiliary fixing member, to thereby omit an insert injection molding process and to thus be easily produced, and is molded by using amorphous metallic powder to thus minimize an eddy current loss (or a core loss).

BACKGROUND ART

A brushless direct-current (BLDC) motor may be classified into a core type (or a radial type) and a coreless type (or an axial type), each having a generally cup-shaped (cylindrical) structure, according to whether or not a stator core exists.

A BLDC motor of a core type structure may be classified into an inner magnet type including a cylindrical stator where coils are wound on a plurality of protrusions formed on the inner circumferential portion thereof in order to form an electronic magnet structure, and a rotor formed of a cylindrical permanent magnet, and an outer magnet type including a stator where coils are wound up and down on a plurality of protrusions formed on the outer circumferential portion thereof, and a rotor formed of a cylindrical permanent magnet on the outer portion of which multiple poles are magnetized.

In a conventional outer magnet type BLDC motor, a main path of a magnetic flux forms a magnetic circuit starting from a permanent magnet of a rotor and proceeding toward a stator via an air gap, and proceeding toward the permanent magnet again and in the direction of a yoke.

In a conventional inner magnet type BLDC motor, a plurality of T-shaped core portions on a stator core around which coils are wound, protrude inwards. Also, the inner side ends of the respective core portions form a circle of a predetermined diameter. Also, a rotor is mounted in an inner space of the inner magnet type BLDC motor in which a cylindrical permanent magnet including a rotational shaft is attached, or at the center of the inner magnet type BLDC motor in which a ring-shaped permanent magnet is attached to a cylindrical yoke including a rotational shaft. The inner magnet type BLDC motor rotates in the same manner as that of the outer magnet type BLDC motor.

The magnetic circuit in the above-described core type BLDC motor has a symmetrical structure in the radial direction around the rotational shaft. Accordingly, the core type BLDC motor has less axial vibration noise, and is appropriate for low-speed rotation. Also, since a portion occupied by an air gap with respect to the direction of the magnetic path is extremely small, a high magnetic flux density may be obtained even if a low performance magnet is used or the plurality of magnets is reduced. As a result, a big torque and a high efficiency may be obtained.

However, such a yoke structure may cause a material loss of a yoke when manufacturing a stator. In addition, a special expensive dedicated winding machine should be used in order to wind coil on the yoke due to a complex structure of the yoke when mass-producing. In addition, a mold investment cost is high at a time of manufacturing a stator, to thus cause a high facility investment cost, in the case of the core type BLDC motor.

Meanwhile, in order to overcome the shortcomings of the core type BLDC motor, the present applicant proposed a double rotor structure that offsets axial vibrations that occurs when the rotor rotates with each other, and increases torque more than twice, as a coreless type axial gap type BLDC motor through Korean Patent Registration No. 213571.

The above-described conventional double rotor BLDC motor, forms a magnetic circuit of a symmetrical structure with respect to the stator and the rotating shaft, to thereby increase an amount of stator coils twice as much as that of a single rotor BLDC motor, by using first and second rotors and a stator, and to also increase the plurality of field magnets twice as many as that of a single rotor BLDC motor, and to thus increase a driving current and magnetic flux density twice as many as those of a single rotor BLDC motor, and to thus obtain a torque at least two times as that of a single rotor BLDC motor of an identical axial gap type.

The axial gap type coreless motor has several advantages, but has a high magnetic resistance since a portion occupied by an armature winding is formed of an air gap and thus has a low magnetic flux density of the air gap compared to the amount of magnets used, to thereby cause the efficiency of the motor to be low.

In addition, if the plurality of turns of the armature winding is increased in order to implement a high torque motor, the air gap should be further increased, and thus the magnetic flux density should be decreased, to thereby result in a further reduction of the efficiency of the motor.

Thus, the axial gap type coreless motor has drawbacks that high-performance magnets should be used or the amount of magnets should be increased, to thus ultimately raise the price of the product. Furthermore, if the amount of wound coils is increased in order to improve the output of the motor, the air gap with respect to the rotor is increased proportionally because of an air-core structure, thereby increasing the magnetic resistance and thus reducing the efficiency of the motor.

In addition, in Korean Patent Laid-open Publication No. 10-2010-31688, was proposed an axial gap type rotating machine in which the amount of the magnetic flux is not reduced, magnets are not scattered even by the centrifugal force and by the thermal circulation driving, while the magnets can be firmly fixed to the yoke of the rotor.

To this end, in Korean Patent Laid-open Publication No. 10-2010-31688, was proposed a structure that a concave portion is formed on a surface of a rotating plate facing a stator and a permanent magnet gets stuck in the concave portion so as to have protrusions from the surface of the rotating plate. However, Korean Patent Laid-open Publication No. 10-2010-31688 discloses the same cureless motor as Korean Patent Registration No. 213571 does. Thus, if the amount of wound coils is increased in order to improve the output of the motor, the air gap with respect to the rotor is increased proportionally because of an air-core structure, thereby increasing the magnetic resistance and thus reducing the efficiency of the motor. In addition, in Korean Patent Laid-open Publication No. 10-2010-31688, was not proposed a structure that an opposite area with respect to a stator coil is optimized according to the use of a bar magnet.

To overcome these problems, the applicant has proposed an axial gap type core motor in Korean Patent Registration No. 213571.

However, the conventional axial gap type core motor has a structure that a plurality of split cores on which stator coils are wound are in the form of a square shape, and a plurality of magnets of a rotor opposing the plurality of split cores are in the form of a trapezoidal or square shape, in which the opposite areas of the rotor magnets facing the stator cores are not optimized. Moreover, since the split cores are configured into a rectangular shape, a mutual gap is wide and a fill factor of coils is low.

Moreover, the conventional axial gap type core motor has a structure that part of the split cores are inserted into respective bobbins on which coils are wound, the rest of the split cores are assembled on the other sides of the respective bobbins, and two parts of the split cores are adhered by a caulking process, to thereby complete the split cores. In this case, the fabricated armature windings are arranged and fixed on a printed circuit board (PCB), and then wired and injection molded, to thus manufacture a stator.

However, since the conventional axial gap type core motor has a structure that a plurality of split cores on which stator coils are wound are integrated by an insert injection molding process, and thus the insert injection molding process is added, working manpower is increased. Further, since the insert injection molding process corresponds to one of essential requirements, production costs have also increased. In addition, since a separate PCB should be used in order to mutually wire coils wound on the insulation bobbin, the working efficiency was reduced due to the complex and tedious manufacturing process.

Meanwhile, the stator core is usually formed by molding a large plurality of silicon steel plates of 0.35 to 0.5 mm thick into a predetermined shape, and then laminating the molded silicon steel plates. In the case of an integral core, a magnetic flux density in the air gap is not uneven due to the influence of slots into which coils are wound, to thus cause occurrence of a cogging torque phenomenon and torque ripples of non-uniform torque.

In order to reduce the cogging torque and torque ripples, a lot of slots are formed in the stator core, or secondary salient poles or secondary slots are slot formed therein, or the stator core is configured to employ a skew structure.

Also, a radial gap type motor is designed to have centers of T-shaped portions that are close to magnets and leading ends of the T-shaped portions that are distant away from both ends. However, the radial gap type motor has a core in which a large plurality of silicon steel plates of an identical shape are laminated, and thus the core can be rounded only in the axial direction.

Moreover, to reduce noise due to the torque ripples, the magnet is skew magnetized, or both sides of a segment magnet are edge processed (shaped), to thereby make distribution of lines of magnetic force have shape of a sinusoidal wave.

However, the above-mentioned solutions have problems that a core is rounded only in the axial direction, it is difficult to perform coil windings or bobbin molding, or costs for magnetization are expensive.

DISCLOSURE

Technical Problem

To solve the above problems or defects, it is an object of the present invention to provide an amorphous split core stator, which maximizes an opposing area between a plurality of split cores and magnets, and increases a fill factor of coils, and an axial gap type motor using the same.

In addition, it is another object of the present invention to provide an amorphous split core stator, which assembles a plurality of the split cores through coupling of irregularities between bobbins or through an auxiliary fixing member, to thereby omit an insert injection molding process and to thus be easily produced, and to thereby omit a separate PCB for connection between coils by successively winding the coils for each split core for an identical phase, and an axial gap type motor using the same.

Furthermore, it is still another object of the present invention to provide an amorphous split core stator, which is molded by using amorphous metallic powder to thereby minimize an eddy current loss (or a core loss), and to thus miniaturize a high speed motor of over 50,000 rpm that is usually applied to electric vehicles, and an axial gap type motor using the same.

In addition, it is yet another object of the present invention to provide an amorphous split core stator and an axial gap type motor using the same, which can reduce noise that is caused by vibration due to torque ripples in which amorphous metallic powder is molded to implement the amorphous split core stator so that a curved shape is formed on the exposed surface of the split core facing a magnet in a radial direction and/or circumferential direction, to thereby obtain a sinusoidal inverse electromotive force (EMF).

Technical Solution

To accomplish the above and other objects of the present invention, according to an aspect of the present invention, there is provided an axial gap type amorphous split core motor comprising:

a rotating shaft whose both ends are rotatably supported;

first and second annular yokes the center of each of which is combined with the rotating shaft and that are placed at an interval therebetween;

first and second rotors having a plurality of magnets that are mounted on the inner surfaces of the first and second yokes with polarities opposite to each other; and a stator having a plurality of split cores that are placed between the first and second rotors and on each of which a coil is wound, wherein the split cores are molded by using amorphous metallic powder.

According to another aspect of the present invention, there is provided an axial gap type amorphous split core motor comprising:

a housing;

a rotating shaft that is rotatably supported in the housing;

a yoke that is rotatable integrally with the rotating shaft while having the rotating shaft as the central axis;

a rotor having a plurality of magnets that are formed into a fan shape, respectively, and that are annularly disposed at an interval on one surface of the yoke; and a stator that is fixed to the housing to face the magnets of the rotor with a gap, in which a plurality of coils are wound on a coil winding space formed on the outer circumference of a plurality of split cores that are formed into a fan shape, respectively, and that are annularly disposed, wherein the plurality of split cores are molded by using amorphous metallic powder.

According to still another aspect of the present invention, there is provided an axial gap type amorphous split core motor comprising:

a housing;

a rotating shaft that is rotatably supported in the housing;

first and second annular yokes the center of each of which is disposed at an interval in opposition to the rotating shaft and that are rotatable integrally with the rotating shaft;

first and second rotors having a plurality of magnets that are mounted in a fan shape on the inner surfaces of the first and second yokes and annularly disposed; and a stator that is disposed between the first and second rotors, and that is fixed to the housing to face the magnets of the rotor with a gap, in which a plurality of coils are wound on a coil winding space formed on the outer circumference of a plurality of split cores that are formed into a fan shape, respectively, and that are annularly disposed, wherein the split cores are molded by using amorphous metallic powder.

According to yet another aspect of the present invention, there is provided an amorphous split core stator for an axial gap type amorphous split core motor, the amorphous split core stator comprising:

a plurality of split cores that are formed into a fan shape, respectively, includes a trench-shaped coil winding space, and are annularly disposed;

a plurality of bobbins that insulate the trench-shaped coil winding space of the plurality of split cores; and coils that are wound on the coil winding space of the bobbins, wherein the plurality of split cores are molded by using amorphous metallic powder.

Advantageous Effects

As described above, according to the present invention, opposite areas between a plurality of split cores and magnets opposing the split cores that are fabricated in a fan shape and radially arranged, respectively, are maximized, and coils wound on the split cores or bobbins are prevented from being protruded toward the outer sides of the split cores or bobbins, to thus increase a fill factor of coils, and maximize efficiency of a motor.

In addition, a plurality of split cores are assembled through coupling of irregularities between bobbins or through an auxiliary fixing member, to thereby omit an insert injection molding process, an inexpensive general-purpose winding machine can be used since a stator has a structure of split cores, and a separate PCB for connection between coils can be omitted by successively winding the coils for each split core for an identical phase, to thereby be easily produced, and to thereby enhance working efficiency.

Furthermore, when split cores are manufactured, the split cores are molded by using amorphous metallic powder or by using a mixture of crystalline metal powder with amorphous metallic powder, to thereby minimize an eddy current loss (or a core loss), and to thus miniaturize a high speed motor of over 50,000 rpm.

In addition, noise that is caused by vibration due to torque ripples can be reduced in which a curved shape is formed on an exposed surface of a split core facing a magnet in a radial direction and/or circumferential direction, to thereby obtain a sinusoidal inverse electromotive force (EMF).

BEST MODE

Hereinafter, an axial gap type amorphous split core motor according to an embodiment of the present invention will be described in detail with reference to the accompanying drawings.

Figure 1:
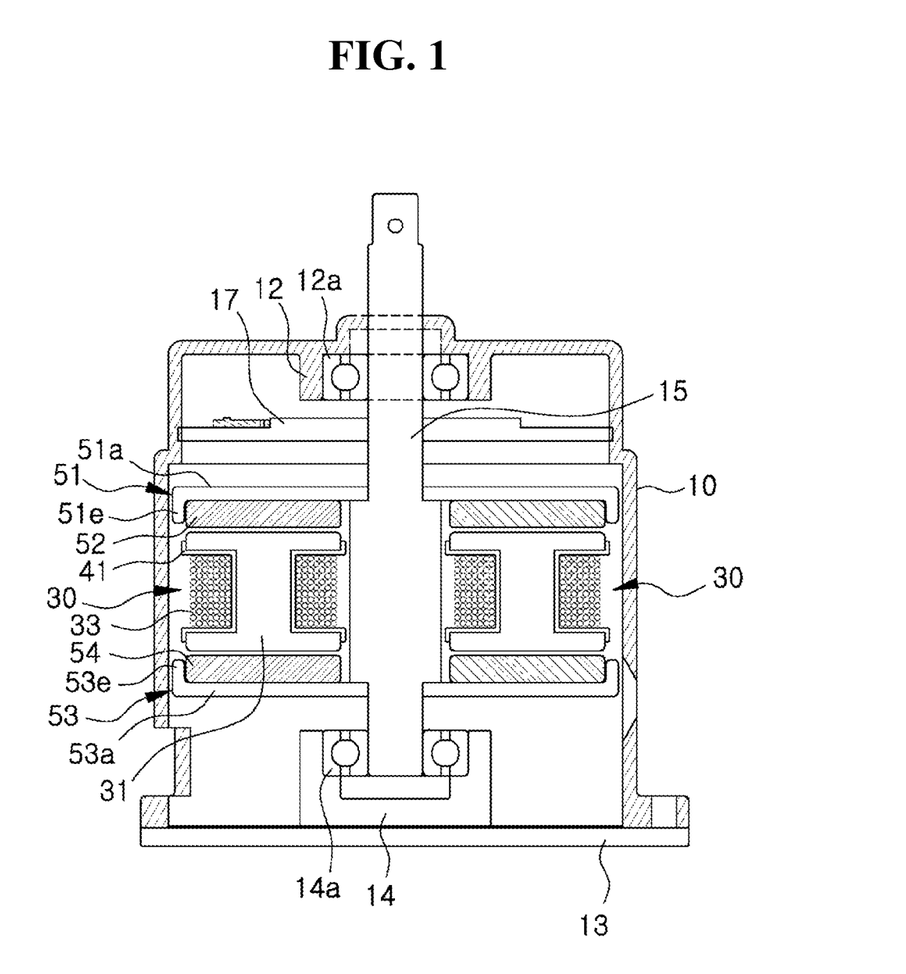
FIG. 1 is a cross-sectional view illustrating an axial gap type amorphous split core motor according to a first embodiment of the present invention.

Referring to FIG. 1, an axial gap type amorphous split core motor according to a first embodiment of the present invention housing includes a housing 10, a rotating shaft 15, a stator 30, and first and second rotors 51 and 53.

The housing 10 has a cylindrical shape having a space including a drive printed circuit board (PCB) 17, the stator 30, the first and second rotors 51 and 53. The upper portion of the housing 10 is closed and the lower portion thereof is closed by a cover 13. The housing 10 contains the drive PCB 17 in the inside of which a drive IC (not shown) is mounted.

The drive PCB 17 is supported by the cover 13, or is placed in the space between the cover 13 and the second rotor 53. Otherwise, the drive PCB 17 may be placed on the outside of the rotating shaft 15.

In addition, the housing 10 includes a cylindrical portion that is formed integrally with the stator 30 and upper and lower covers that are coupled to the upper/lower portions of the cylindrical portion.

The rotating shaft 15 is rotatably mounted in the housing 10 and the cover 13, respectively. One end of the rotating shaft 15 penetrates through the housing 10. The rotating shaft 15 is rotatably supported by a bearing 12a inserted into a bearing housing 12 provided in the inside of the housing 10. The other end of the rotating shaft 15 is rotatably supported by a bearing 14a inserted into a bearing housing 14 provided in the inside of the cover 13.

The stator 30 is mounted between the first and second rotors 51 and 53, and the rotating shaft 15 penetrates through the center of the stator 30. In addition, the outer circumference of the stator 30 is compressively fixed to the inner circumference of the housing 10, or the stator 30 may be formed integrally with the housing 10, while forming part of the housing 10 when a stator support for integrating a plurality of split cores 31 is formed.

In FIG. 1, reference numerals 51a and 53a denote back yokes, and reference numerals 51e and 53e denote shield flanges.

Figure 6:
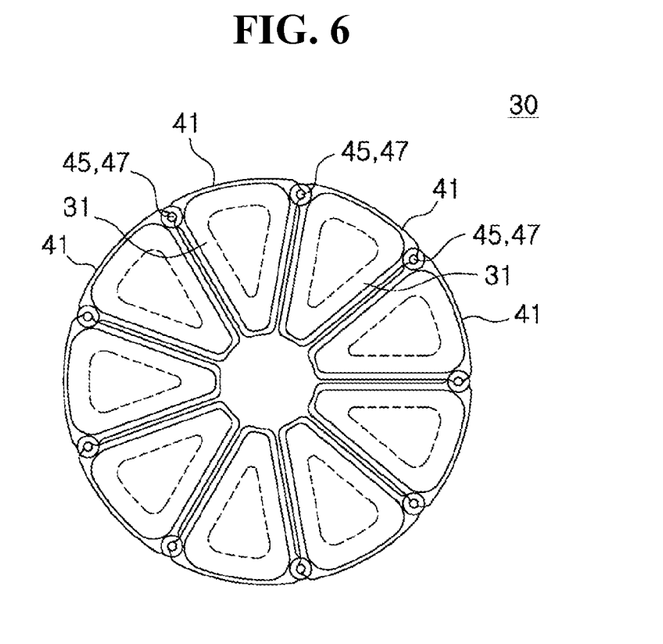
FIG. 6 is a plan view illustrating a stator that is formed by annularly assembling a plurality of amorphous split cores shown in FIG. 4, by using an irregularities coupling structure formed in bobbins, respectively.
Figure 8:
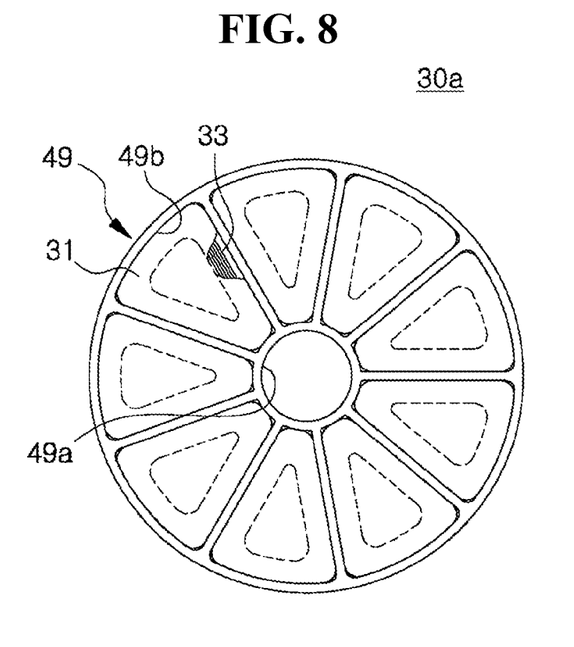
FIG. 8 is a plan view illustrating a stator that is formed by annularly assembling a plurality of amorphous split cores by the auxiliary core fixing member shown in FIG. 7.

As shown in FIGS. 6 and 8, the stator 30 includes the plurality of split cores 31 that are annularly arranged and coils 33 that are wound on the plurality of the split cores 31.

Figure 2:
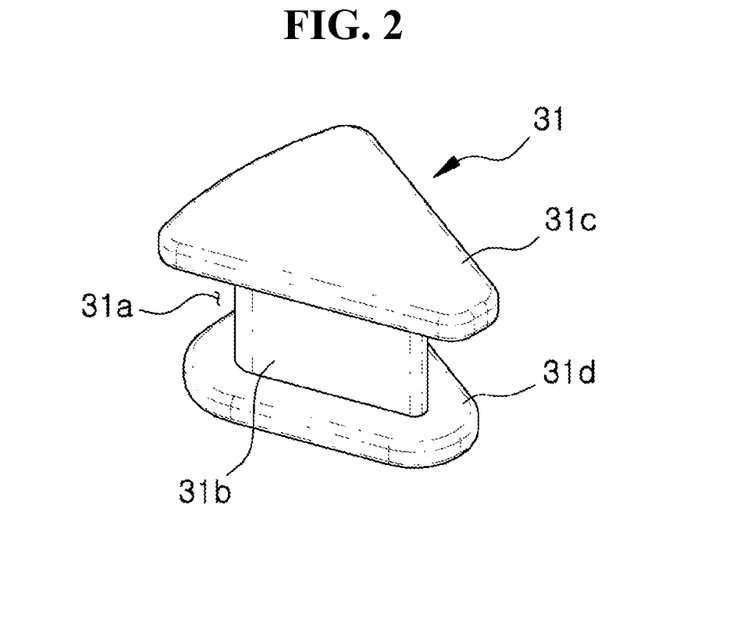
FIG. 2 is a perspective view illustrating an amorphous split core shown in FIG. 1.
Figure 3:
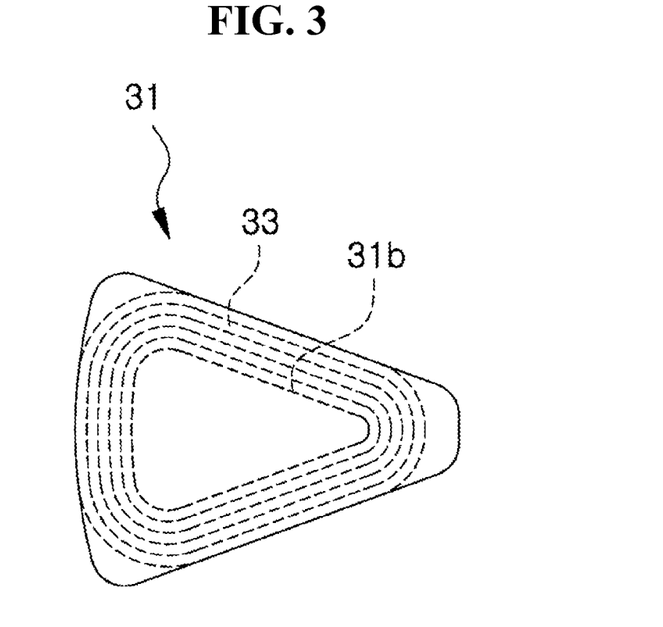
FIG. 3 is a view showing a state where coils are wound on the amorphous split core shown FIG. 2.
Figure 4:
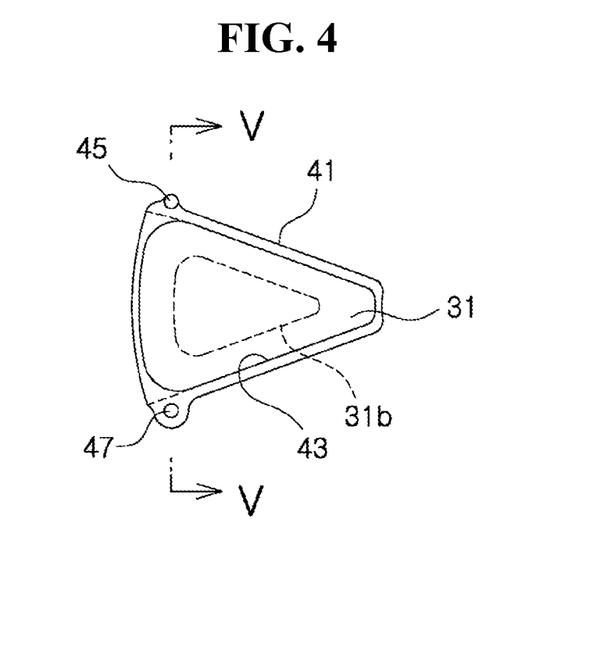
FIG. 4 is a plan view illustrating a bobbin is coupled to the amorphous split core shown in FIG. 3.
Figure 5:
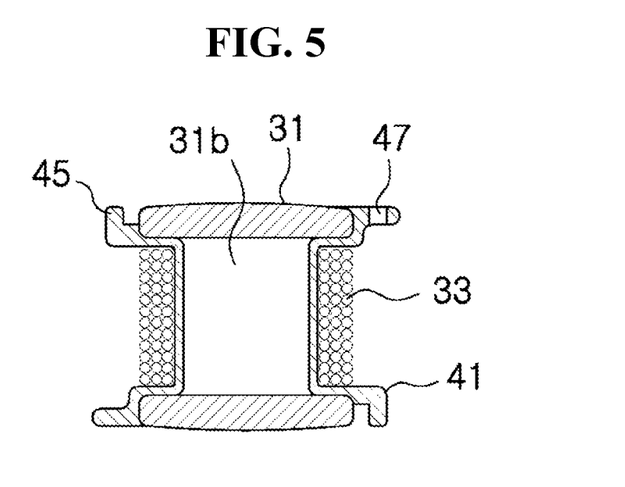
FIG. 5 is a cross-sectional view taken along line V-V shown in FIG. 4.

As shown in FIG. 2, the plurality of split cores 31 are formed in a substantial fan shape. Thus, in the case that the split cores 31 are fabricated in a fan shape, respectively, the effective areas of the split cores 31 are increased when the split cores 31 are arranged in a radial direction (see FIGS. 6 and 8) around the rotating shall 15, to thereby use the space as much as possible, that is, at maximum. Thus, the opposite areas of the first and second rotors 51 and 53 with respect to the magnets 52 and 54 are maximized, to thereby minimize leakage of the magnetic flux (loss).

Such a plurality of split cores 31 may be molded by using a mixture of amorphous metallic powder with a binder, or by using a mixture of amorphous metallic powder, crystalline metal powder with excellent soft magnetic properties, and a binder, at predetermined ratios. In this case, when compared to the case that the amorphous metallic powder of 100% is used, the case that the metal powder is mixed with the amorphous metallic powder at a predetermined ratio can solve difficulties of high-pressure sintering, and increase the permeability.

In addition, in the case of each of the plurality of split cores 31, first and second flanges 31c and 31d are formed in a fan shape in opposition to each other, along the lateral surface of a fan-shaped coil winding portion 31b, to thereby secure a trench-shaped coil winding space 31a (see FIG. 2) on which coils 33 are wound between the first and second flanges 31c and 31d. As a result, even if a plurality of split cores 31 are coupled between bobbins 41 (see FIG. 6) on which coils 33 are wound, respectively, the coils 33 are not protruded to the outsides of the bobbins 41. Accordingly, when the bobbins 31 are connected and assembled with each other, a problem that the bobbins are mutually interfered with each other can be solved. Ultimately, a fill factor of coils is maximized to thus improve efficiency of the motor.

Referring to FIGS. 2 to 5, the bobbin 41 is integrally formed by using an insert injection molding method using an insulating resin, so as to surround a trench-shaped coil winding space 31a with the insulating resin, with the exception of both side surfaces of the fan-shaped split core 31. In this case, the bobbin 41 is formed so as to surround the first and second fan-shaped flanges 31c and 31d of the split core 31. As a result, the bobbin 41 is formed in a fan shape roughly corresponding to the shape of the split core 31, and the split core 31 is inserted into the inner side 43 of the bobbin 41.

In addition, when the bobbins 41 are annularly assembled as shown in FIG. 6, a coupling protrusion 45 is formed at one side of the outer edge of the fan shape in a direction parallel to an axial direction so that the bobbins 41 are mutually coupled between the adjacent bobbins 41, and a coupling hole 47 is formed at the other side of the outer edge of the fan shape.

The plurality of bobbins 41 are annularly assembled, in which coils 33 are consecutively wound for an identical phase so as to minimize connection of terminals of the coils 33 between the split cores 31 and then one bobbin 41 is connected to two adjacent bobbins 41 by using the coupling protrusion 45 and the coupling hole 47, as shown in FIG. 6. In addition, the mutual coupling of the bobbins 41 is carried out by using the coupling protrusion 45 and the coupling hole 47, and then the protruded tip portion of the coupling protrusion 45 is thermally fused and fixed, to thereby omit a resin molding process.

In this case, it is possible to adopt any well-known irregularity coupling structure or snap coupling structure as a coupling structure of mutually coupling the adjacent bobbins 41 when the bobbins 41 are annularly assembled, other than the coupling protrusion 45 and the coupling hole 47.

Moreover, the plurality of the thus-assembled split cores 31 are molded with a resin for integration, reinforcement of durability, and water-proof sealing, to thereby form a stator support. A bearing structure with which the housing 10 is assembled, and/or that rotatably supports the rotating shaft may be added in the stator support.

Meanwhile, the plurality of the split cores 31 can be mutually assembled through the plurality of the bobbins 41 as described above, but the present invention is not limited thereto. For example, as shown in FIGS. 7 and 8, the plurality of the split cores 31 can be mutually assembled through an auxiliary fixing member 49.

Figure 7:
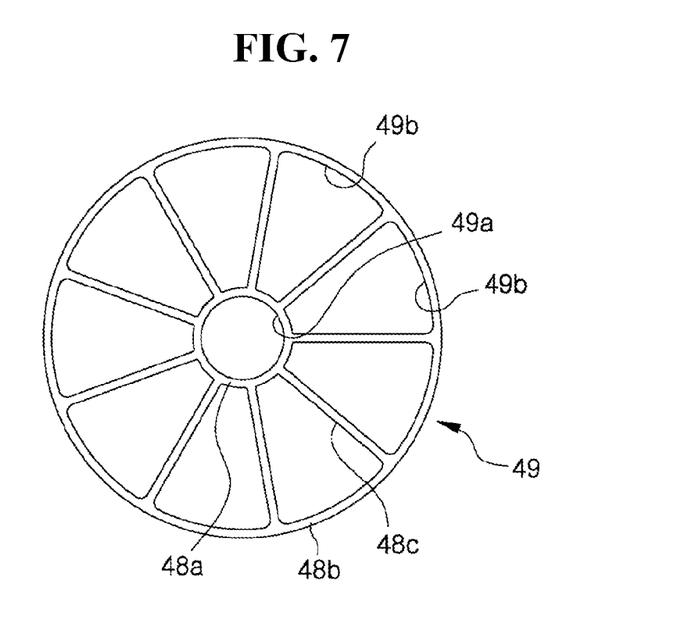
FIG. 7 is a plan view illustrating an auxiliary core fixing member into which a plurality of amorphous split cores are inserted.

As shown in FIG. 7, the auxiliary fixing member 49 is configured to have a plurality of connection portions 48c that are radially connected between an inner ring 48a and an outer ring 48b, to thereby form a structure that a plurality of insertion holes 49b are disposed, in which a through-hole 49a through which the rotating shaft 15 passes is formed at the center of the inner ring 48a, and the plurality of insertion holes 49b through which a plurality of split cores 31 pass, respectively, are radially formed around the through-hole 49a. In this case, the plurality of insertion holes 49b are substantially formed into a fan shape, respectively, so as to correspond to the shapes of the split cores 31 and the bobbins 41.

In the case of the stator 30a using the auxiliary fixing member 49 as described above, the split core 31 is compressively coupled into the insertion hole 49b at a state where the coils 33 are directly wound, as shown in FIG. 8. If all the split cores 31 are inserted into and completely assembled with the plurality of insertion holes 49b, respectively, the split cores 31 are molded with a resin through an insert injection molding process, in the same manner as that of using the bobbins, to thereby form a stator support and to thus completely fix the plurality of split cores 31 to the auxiliary fixing member 49. In this case, a pair of auxiliary fixing members 49 are used to fix the plurality of split cores 31 at both sides thereof, to thus omit a resin molding process.

Meanwhile, the first and second rotors 51 and 53 are formed of an identical structure to each other. However, the first and second rotors 51 and 53 are different from each other, in the fact that a plurality of magnets 52 and 54 are disposed in a direction facing the stator 30 in view of a mounting direction. Therefore, the configuration of the first and second rotors 51 and 53 will be described with respect to only the first rotor 51, and the configuration of the second rotor 53 will be omitted.

In addition, according to the present invention, the first and second rotors 51 and 53 are placed on both sides of the stator 30 at intervals, and if magnets of the opposite polarities to each other are placed in respectively opposite portions of the first and second rotors 51 and 53, the axial vibration of the rotors is offset, to thus suppress noise from talking place.

Figure 9:
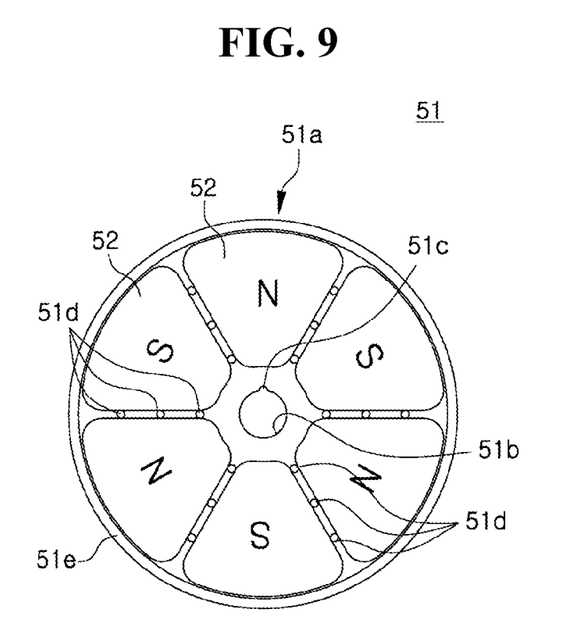
FIG. 9 is a plan view illustrating a first rotor shown in FIG. 1.
Figure 10:
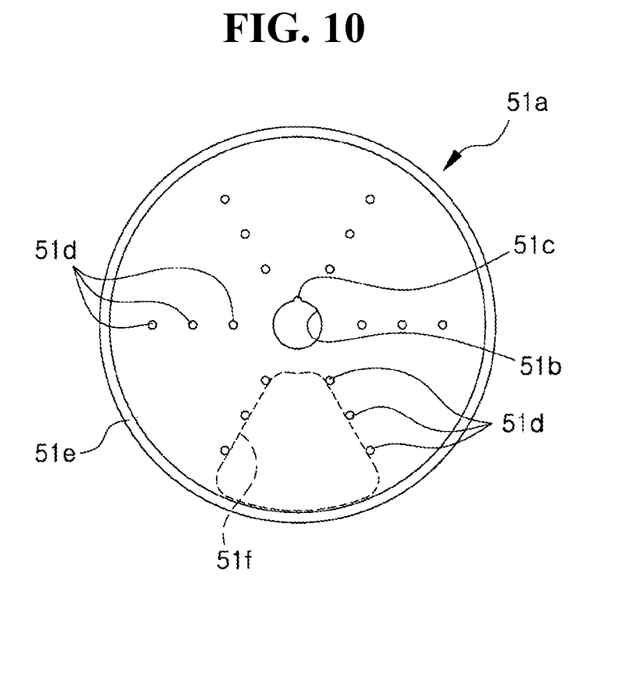
FIG. 10 is a plan view illustrating a back yoke shown in FIG. 9.

Referring to FIGS. 9 and 10, the first rotor 51 is provided with an annular back yoke 51a to the center of which the rotating shall 15 is fixed, and a plurality of magnets 52 that are radially arranged in the back yoke 51a.

The back yoke 51a is made in a substantially annular form, and is configured to have a central through-hole 51b through which the rotating shaft 15 penetrates, and a key groove 51c that is formed at one portion of the through-hole 51b to rotate with the rotating shaft 15.

In addition, the back yoke 51a is provided with a plurality of location guide protrusions 51d that are formed in line at intervals on one surface on which the magnets 52 are seated, and that are radially arranged around the through-hole 51b, so as to guide locations to which the plurality of magnets 52 are attached, and simultaneously support the lateral surfaces of the plurality of fan-shaped magnets 52, that is, a straight line portion. Moreover, the back yoke 51a is provided with a shield flange 51e that is formed along the outer circumference of the back yoke 51a so as to prevent leakage of the magnetic flux of the magnetic circuit, to thereby support the curved portion of the plurality of magnets 52.

As a result, as shown in FIG. 10, the back yoke 51a employed in the present invention is provided with six magnet placement areas 51f divided by the shield flange 51e and the plurality of location guide protrusions 51d. As shown in FIG. 9, the six magnets 52 are compressively coupled on the six magnet placement areas 51f and simultaneously fixed by an adhesive, to thereby achieve robust attachment.

Moreover, according to the present invention, it is desirable that the back yoke 51a is molded by using amorphous metallic powder in the same manner as the case of the stator core. As such, in the case that the back yoke 51a is molded by using the amorphous metallic powder, it is possible to form the shield flange 51e that surrounds the curved portion of a fan-shaped magnet so as to be bent at right angles on the outer circumference of a circular plate. Also, it is possible to integrally form the plurality of location guide protrusions 51d for supporting the straight line portion of the fan-shaped magnet so as to be protruded from the circular plate.

In the case of a silicon steel plate that is a common magnetic path forming material, it is not substantially possible to integrally form the shield flange 51e and the plurality of location guide protrusions 51d on the back yoke 51a.

The plurality of magnets 52 that are magnetized with the respectively different poles (that is, N and S poles) are alternately placed and fixed between the location guide protrusions 51d of the back yoke 51a and the adjacent location guide protrusions 51d thereof. The plurality of magnets 52 are respectively formed in a fan shape in order to increase the effective area like the split cores 31. As a result, the plurality of magnets 52 and the plurality of split cores 31 maximize the opposite area facing each other, to thus minimize magnetic flux leakage (or loss) and to thereby improve the motor efficiency.

In addition, the first and second rotors 51 and 53 may form a rotor support by mounting the plurality of magnets 52 in the magnet placement areas 51f that are divided by the shield flange 51e and the location guide protrusions 51d of the back yoke 51a and then molding the spaces between the plurality of magnets 52 by a resin. In this case, a bushing having a key groove 51c combined with the rotating shaft 15 may be integrally formed on the inner circumference.

Meanwhile, the plurality of the fan-shaped magnets 52 have been provided in this embodiment of the present invention, but the present invention is not limited thereto. In other words, it is also possible to split magnetize an annular single magnet so that N poles and S poles are alternately formed.

In addition, the back yoke 51a may be fabricated by using a silicon steel plate that is a general magnetic path forming material. In this case, the plurality of magnets 52 are mounted on the back yoke and then are molded by a resin at portions corresponding to the shield flange 51e and the plurality of location guide protrusions 51d, that is, in place of the shield flange 51e and the plurality of location guide protrusions 51d, to thus form a rotor support and to thereby make it possible to fix the plurality of magnets 52 to the back yoke 51a.

Figure 11:
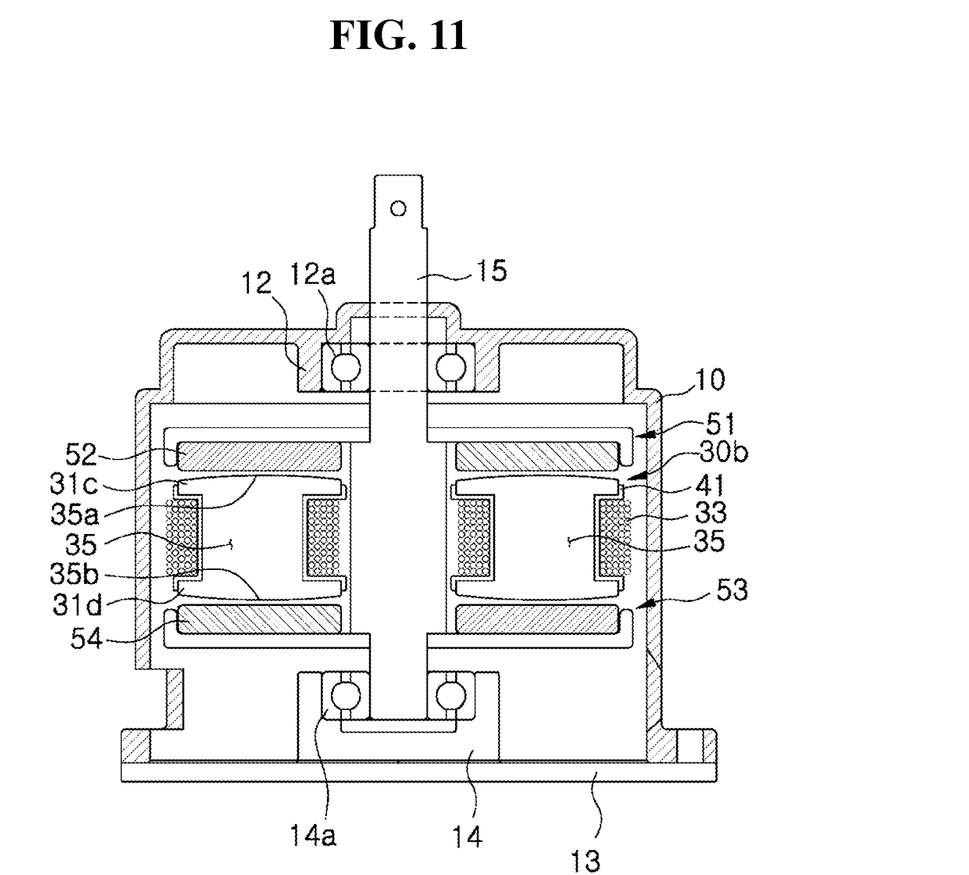
FIG. 11 is a cross-sectional view illustrating an axial gap type amorphous split core motor according to a second embodiment of the present invention.

FIG. 11 is an axially cross-sectional view illustrating an axial gap type amorphous split core motor according to a second embodiment of the present invention. In the second embodiment, the same elements as those of the first embodiment are assigned with the same reference numerals as those of the first embodiment, and thus the detailed description thereof will be omitted.

In the second embodiment, a stator 30b includes a plurality of fan-shaped split cores 35 in the same manner as that of the first embodiment. The split cores 35 of the second embodiment are molded to have a curved shape in the radial direction (FIG. 11) and/or in the circumferential direction (FIG. 5), with respect to the exposed surfaces 35a and 35b facing the magnets 52 and 54, respectively, to thus reduce vibrations and noise due to torque ripples.

In other words, the split cores 35 are molded to be gradually protruded to form a curved shape as it goes from both ends of the first and second flanges 31c and 31d toward the centers thereof, in the radial and/or circumferential directions. Thus, each of the split cores 35 is set to have a relationship that distances from the opposing magnets 52 and 54 become shorter as it goes to the centers of the first and second flanges 31c and 31d, and become farther as it goes to both ends of the first and second flanges 31c and 31d, in the radial and/or circumferential directions.

Thus, the reason why it is possible to mold the split cores 35 to have a curved shape in the radial and/or circumferential directions, with respect to the exposed surfaces 35a and 35b of the split cores 35 facing the magnets 52 and 54, respectively, is because the split cores 35 are fabricated by a compression molding method by using amorphous metallic powder.

As described in the second embodiment, if the split cores 35 are implemented to have a curved shape in the radial and/or circumferential directions, with respect to the exposed surfaces 35a and 35b of the split cores 35 facing the magnets 52 and 54, respectively, a sinusoidal electromotive force (EMF) can be obtained, to thus reduce vibrations and noise due to torque ripples, that is, reduce noise caused by vibrations due to torque ripples. As the curvatures of the exposed surfaces 35a and 35b become greater, noise can be minimized, but in this case, as it goes farther away from the magnets, the efficiency of the motor decreases. As a result, it is preferable to appropriately select the curvatures of the exposed surfaces 35a and 35b in accordance with the field in which the motor is used.

Hereinbelow, a method of manufacturing magnetic circuit components such as split core and the back yoke in accordance with the present invention, will be described.

The magnetic circuit components such as the split core and the back yoke of the present invention are obtained by using amorphous metallic powder that is formed as follows.

First of all, amorphous metal is manufactured into ultra-thin type amorphous metallic ribbons or strips of 30 μm or less by using a rapid solidification processing (RSP) method through a melt spinning process, and then the ultra-thin type amorphous metallic ribbons or strips are pulverized, to thus obtain amorphous metallic powder. Here, the obtained amorphous metallic powder has a size in the range of 1 to 150 μm.

In this case, the amorphous metallic ribbons or strips may be heat-treated at 400-600° C. under a nitrogen atmosphere, so as to have a nanocrystalline microstructure that can promote high permeability.

In addition, the amorphous metallic ribbons or strips may be heat-treated at 100-400° C. in the air, to improve the pulverization efficiency.

Of course, it is possible to use spherical powder obtained as the amorphous metallic powder by an atomization method other than the pulverization method of the amorphous metallic ribbons or strips.

For example, any one of a Fe-based, Co-based, and Ni-based amorphous alloys may be used as the amorphous metal. Preferably, a Fe-based amorphous metal is advantageous in terms of price. The Fe-based amorphous metallic is preferably any one of Fe—Si—B, Fe—Si—Al, Fe—Hf—C, Fe—Cu—Nb—Si—B, and Fe—Si—N. In addition, the Co-based amorphous metal is preferably any one of Co—Fe—Si—B and Co—Fe—Ni—Si—B.

Thereafter, the pulverized amorphous metallic powder is classified depending on the size of the particle, and then mixed in a powder particle size distribution having optimal composition uniformity. In this case, since the pulverized amorphous metallic powder is made up in a plate shape, a packing density is lowered below the optimal condition, when the amorphous metallic powder is mixed with a binder to then be molded into a shape of components. Accordingly, the present invention uses a mixture of a predetermined amount of spherical soft magnetic powder with plate-shaped amorphous metallic powder, to thus increase the molding density, in which the spherical soft magnetic powder is made of spherical powder particles, to promote improvement of magnetic properties, that is, permeability.

For example, one of MPP powder, HighFlux powder, Sendust powder, and iron powder, or a mixture thereof may be used as the spherical soft magnetic powder that may promote improvement of the permeability and the packing density.

A binder mixed in the mixed amorphous metallic powder is, for example, a thermosetting resin such as sodium silicate called water glass, ceramic silicate, an epoxy resin, a phenolic resin, a silicone resin or polyimide. In this case, the maximum mixing ratio of the binder is preferably 20 wt %.

The mixed amorphous metallic powder is compressed and molded into a desired shape of cores or back yokes by using presses and molds at a state where binders and lubricants have been added in the amorphous metallic powder. When a compression molding process is achieved by presses, a molding pressure is preferably set to 15-20 ton/cm$^2$.

After that, the molded cores or back yokes are sintered in the range of 300-600° C. for 10-600 min to implement magnetic properties.

In the case that the heat-treatment temperature is less than 300° C., heat treatment time increases to thus cause a loss of productivity, and in the case that heat-treatment temperature exceeds 600° C., deterioration of the magnetic properties of the amorphous metals occurs.

As described above, when amorphous metallic materials are powdered, compressed, and molded, in the present invention, the components such as the split cores and back yokes of complex shapes are easily molded, and the crystalline metal powder having excellent soft magnetic properties is added in the amorphous metallic powder, to thereby promote improvement of the magnetic permeability and improvement of the molding density at the time of compression molding.

As described above, according to the present invention, opposite areas between a plurality of split cores 31 and magnets 52 opposing the plurality of split cores 31 that are fabricated in a fan shape and radially arranged, respectively, are maximized, and coils 33 wound on the split cores 31 or bobbins 41 are prevented from being protruded toward the outer sides of the split cores 31 or bobbins 41, to thus increase a fill factor of coils, and maximize efficiency of a motor.

In addition, a plurality of split cores 31 are temporarily assembled through coupling of irregularities between a plurality of bobbins or through an auxiliary fixing member, and then are molding-processed, to thereby omit an insert injection molding process, and since a stator has a structure of split cores, a separate PCB for connection between coils can be omitted by successively winding the coils for each split core for an identical phase, to thereby be easily produced, and to thereby enhance working efficiency.

Furthermore, when split cores are manufactured, the split cores are molded by using amorphous metallic powder or by using a mixture of crystalline metal powder with amorphous metal powder, to thereby minimize an eddy current loss (or a core loss), and to thus be appropriate to be used as a high speed motor of over 50,000 rpm.

In the case of the above-described embodiments, a double rotor structure where the first and second rotors are disposed at both sides of the stator has been described, for example. However, the present invention can be applied to a structure of a combination of a single stator and a single rotor.

In addition, the present invention can be extended and applied to a structure where double stators are disposed at both sides of a single rotor, or double rotors are combined, that is, a structure of three rotors that are provided between a pair of stators and in the outer side of the pair of stators.

Meanwhile, the axial gap type motor of the present invention is particularly well suited for cases of requiring an increase in thickness and a decrease in diameter when compared to the radial gap type motor.

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

INDUSTRIAL APPLICABILITY

The present invention can be applied to an axial gap type motor using an amorphous split core stator, which maximizes an opposing area between a plurality of split cores and magnets, increases a fill factor of coils, and is molded by using amorphous metallic powder, to thus minimize an eddy current loss (or a core loss).

The invention claimed is:

1. An axial gap type amorphous split core motor comprising:
    a rotating shaft whose both ends are rotatably supported;
    first and second annular yokes the center of each of which combined with the rotating shaft and that are placed at an interval therebetween;
    first and second rotors having a plurality of magnets that are mounted on the inner surfaces of the first and second yokes with polarities opposite to each other; and
    a stator having a plurality of split cores that are placed between the first and second rotors and on each of which a coil is wound,
    wherein the split cores are molded by using amorphous metallic powder.

2. The axial gap type amorphous split core motor according to claim 1, wherein the split cores are molded by mixing the amorphous metallic powder made into a plate shape with crystalline metal powder with excellent soft magnetic properties and made into a spherical shape, in order to increase permeability and a packing density.

3. The axial gap type amorphous split core motor according to claim 1, wherein the plurality of magnets that are coupled to the first and second rotors, and the plurality of the split cores that are coupled to the stator are formed into a fan shape, respectively, and are placed radially around the rotating shaft, in order to maximize mutual opposite areas.

4. The axial gap type amorphous split core motor according to claim 1, wherein the plurality of split cores form a trench-shaped coil winding space along a fan-shaped lateral surface so that coils are wound in the inner sides of the plurality of split cores.

5. The axial gap type amorphous split core motor according to claim 4, wherein the plurality of split cores comprise a plurality of bobbins that surround the coil winding space, respectively, and that are mutually separably connected between the adjacent split cores.

6. The axial gap type amorphous split core motor according to claim 5, wherein the plurality of bobbins are assembled with the mutually adjacent bobbins through coupling of irregularities.

7. The axial gap type amorphous split core motor according to claim 5, wherein the stator has an auxiliary fixing member having a plurality of fan-shaped through-holes into which the plurality of split cores are radially inserted and fixed.

8. The axial gap type amorphous split core motor according to claim 5, wherein the plurality of split cores are completely assembled through a resin molding process at a state where the plurality of split cores are assembled by using the bobbins.

9. The axial gap type amorphous split core motor according to claim 1, wherein the first and second yokes further comprise a plurality of protrusions for guiding locations, which guide the locations at which the plurality of magnets are mounted, respectively, and support the lateral surfaces of the magnets.

10. The axial gap type amorphous split core motor according to claim 1, wherein a shield flange that surrounds the outer circumference of the magnets is extended and formed on an annular circumference, in order to minimize leakage of the magnetic flux from the magnets that are mounted in the first and second yokes.

11. The axial gap type amorphous split core motor according to claim 1, wherein the stator comprises:
    the plurality of split cores that are formed into a fan shape, respectively, includes a trench-shaped coil winding space, and are annularly disposed;
    the plurality of bobbins that insulate the trench-shaped coil winding space of the plurality of split cores, and that are mutually separably connected between the adjacent split cores; and
    the coils that are wound on the coil winding space of the bobbins.

12. The axial gap type amorphous split core motor according to claim 1, wherein the split cores are configured to have a curved shape that is formed on the exposed surface of the split core facing a magnet of the rotor in a radial direction and/or circumferential direction, respectively.

* * * * *